United States Patent [19]

Brown

[11] Patent Number: 4,627,514

[45] Date of Patent: Dec. 9, 1986

[54] VEHICLE ANTI-THEFT DEVICE

[76] Inventor: Clarence Brown, 7358 Hurtgen Forest, Houston, Tex. 77033

[21] Appl. No.: 726,662

[22] Filed: Apr. 24, 1985

[51] Int. Cl.$^4$ ............................................. B60R 25/02
[52] U.S. Cl. ..................................... 180/287; 70/417; 70/252; D8/333
[58] Field of Search .................. 180/287; 70/252, 417; D8/333, 338; 292/256, 256.6, 256.65, 256.67, 256.73, DIG. 2; 24/457, 464, 487

[56] References Cited

U.S. PATENT DOCUMENTS

| | | | |
|---|---|---|---|
| D. 59,580 | 11/1921 | Copeland. | |
| D. 227,547 | 7/1973 | Bodan. | |
| D. 241,505 | 9/1976 | Henry. | |
| D. 247,423 | 3/1978 | Kaplan. | |
| 3,590,612 | 7/1971 | Henning | 70/239 |
| 3,867,822 | 2/1975 | Morse et al. | 292/256.67 |
| 3,916,658 | 11/1975 | Barry | 180/287 |
| 4,008,589 | 2/1977 | Harrell | 70/424 |
| 4,076,291 | 2/1978 | Pope et al. | 292/256.67 |
| 4,104,895 | 8/1978 | Tankel | 70/237 |
| 4,123,924 | 11/1978 | Dworkis | 180/287 |
| 4,167,222 | 9/1979 | Bindari | 180/287 |

Primary Examiner—John J. Love
Assistant Examiner—Kenneth R. Rice
Attorney, Agent, or Firm—Vaden, Eickenroht, Thompson & Boulware

[57] ABSTRACT

An anti-theft device for mounting on a steering column of a vehicle to prevent the unauthorized use or theft of the vehicle. The device includes two semi-circular rigid band portions hingedly joined along adjacent edges. The band portions may be permanently secured in the steering column in close surrounding relation by one or more fasteners engaging opposing flanges on the opposite end edges of the band portions.

7 Claims, 5 Drawing Figures

VEHICLE ANTI-THEFT DEVICE

BACKGROUND OF THE INVENTION

1. Field of the Invention

This invention relates generally to vehicle anti-theft devices and more particularly to anti-theft devices mounted on the steering column of the vehicle.

2. Description of the Prior Art

Various devices have been employed in the past to prevent the theft or unauthorized use of a vehicle. Some of the devices are designed to deny unauthorized access to the interior of the vehicle, whereas others are designed to deny access to the ignition system or other components of the vehicle contained within a vehicle steering column. This application is directed towards the latter type of device. For the purposes of this application, the "vehicle" shall mean automobile, truck, boat, plane, tractor, construction equipment or any other like apparatus incorporating a steering column. U.S. Pat. Nos. 3,590,612; 4,008,589: 4,104,894; and 4,167,222 are examples of conventional anti-theft devices designed to protect a vehicle steering column. Generally existing designs require protective coverings to be mounted on the steering column to prevent a thief from removing the cover from the steering column and by-passing the ignition switch of the vehicle by short circuiting the ignition system.

However, such conventional devices are difficult to install on the steering column, as the steering column is frequently located in a constricted position within the vehicle. Further, existing designs are not completely successful in denying access to the steering column.

Therefore, it is a principal feature and advantage of this invention to provide an improved vehicle anti-theft device.

It is another feature and advantage of this invention to provide an improved anti-theft device that is easy to install on a vehicle's steering column.

SUMMARY OF THE INVENTION

This invention provides a rigid band split into two semi-circular sections. The band portions are hingedly secured to each other along a pair of end edges. The band is placed in close surrounding relation to a steering column and the band portions rotated so that the other pair of end edges of the band portions are brought together. A pair of aligned flanges are mounted on the band portion and adjacent the second end edges. The flanges include at least one pair of aligned openings. A fastener, such as a screw, is inserted through one of the flange openings and threadedly engages the other opening to secure the anti-theft device on the steering column. The heads of the screws may be coated with an epoxy or like material to prevent removal.

In an alternative embodiment of the invention, the steering column includes a concentric groove. The band portions each include a continuous aligned ridge on respective inside surfaces. The ridge is designed to engage the groove on the steering column and prevent the anti-theft device from being longitudinally moved with respect to the steering column.

In yet another alternate embodiment of the invention, the steering column may include a number of projections, such as a gear shift lever or ignition switch. The band portions in this embodiment include a like number of aligned openings adapted to receive the projections on the steering column when the anti-theft device is mounted thereon.

DETAILED DESCRIPTION OF THE INVENTION

Figure 2:
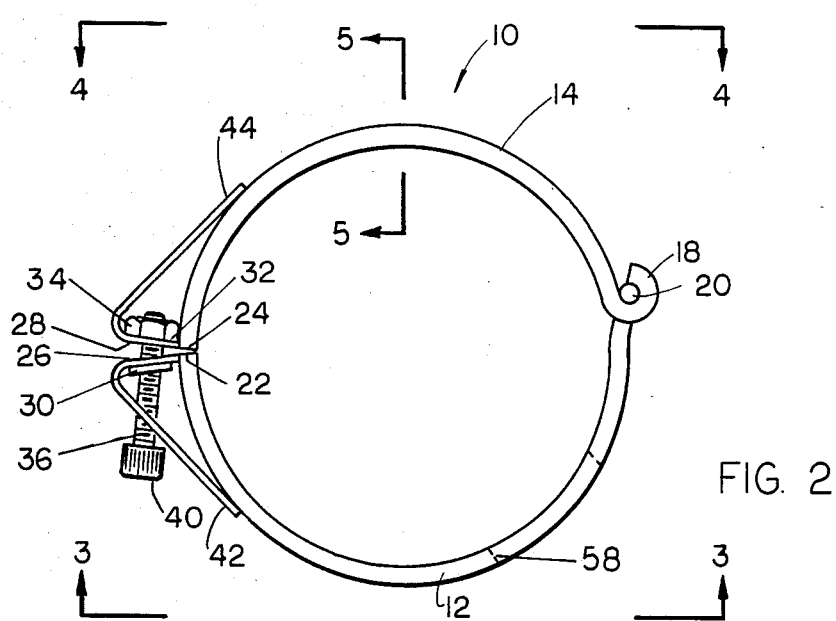
FIG. 2 is a top view of a preferred embodiment of this invention.
Figure 3:
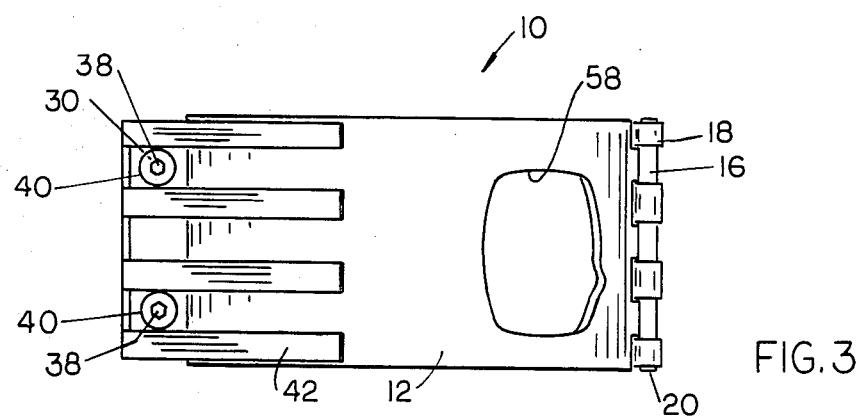
FIG. 3 is a side view of this invention along view 3—3 of FIG. 2.
Figure 4:
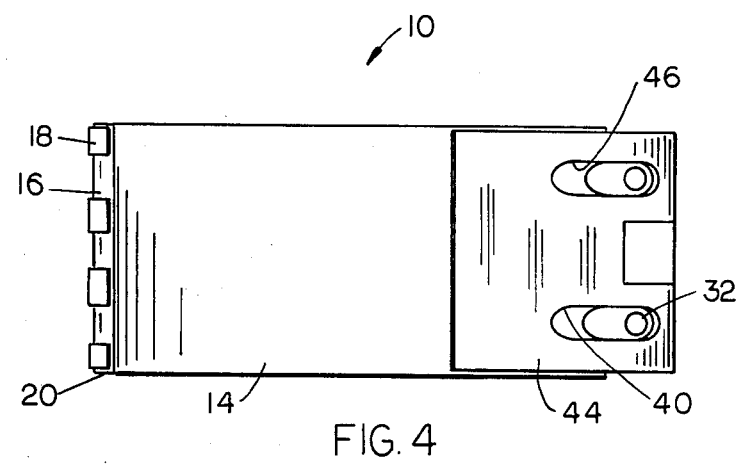
FIG. 4 is a side view of this invention along view 4—4 of FIG. 2.

Referring now to FIGS. 2-4, there is shown the anti-theft device of this invention 10, comprising a band divided into two semi-circular band portions 12 and 14. The band portions may be constructed of any rigid material, but preferably are constructed of a high strength, case hardened metallic material. The band portions are pivotally connected along a first section of end edges 16 and 18 by hinge 20. The anti-theft device is shown in a closed position, with opposite end edges 22 and 24 of band portions 12 and 14, respectively, adjacent each other. A pair of opposing flanges 26 and 28 are each mounted on band portions 12 and 14, respectively. Flanges 26 and 28 include at least one pair of aligned openings 30 and 32. Two pairs of openings 30 and 32 are illustrated. Each pair of openings include one opening which is threaded such as by mounting a nut 34 in alignment with hole 32. Screw 36 is inserted through unthreaded hole 30 of flange 26 and threadedly engages hole 32 (including nut 34) of flange 28. Likewise, a second screw 36 may be inserted through the remaining hole 38 and threadedly engage second hole 32 in flange 28.

Screws 36, as shown, comprise socket head screws with hexagonal cavities 38 in heads 40. Of course, any other type of threaded fastener could be used if desired, such as a slot head or phillips head screw. In the preferred embodiment of the invention, to prevent unauthorized removal of the anti-theft device, the heads 40 of the screws 36 along with cavities 38 may be coated with a plastic material, such as an epoxy, so that a tool will not be able to back out the screws. This will permanently mount the anti-theft device on the steering column. As an additional precaution, flanges 26 may include one or more inclined reinforcing bands 42 extending from flange 26 to the exterior of band portion 12. Bands 42 act to increase the strength of flange 26 against an attempt to forceably remove the anti-theft device from the steering column. In addition, the bands 42 are spaced apart or provide openings for installation of the screws 36. However, the bands also restrict lateral access to the heads 40 of the screws to a thief attempting to by-pass the socket 38 with a pair of pliers or otherwise. Flange 28 may also include a similar reinforcing band 44 with openings 46, if desired, aligned with the holes 32.

Figure 1:
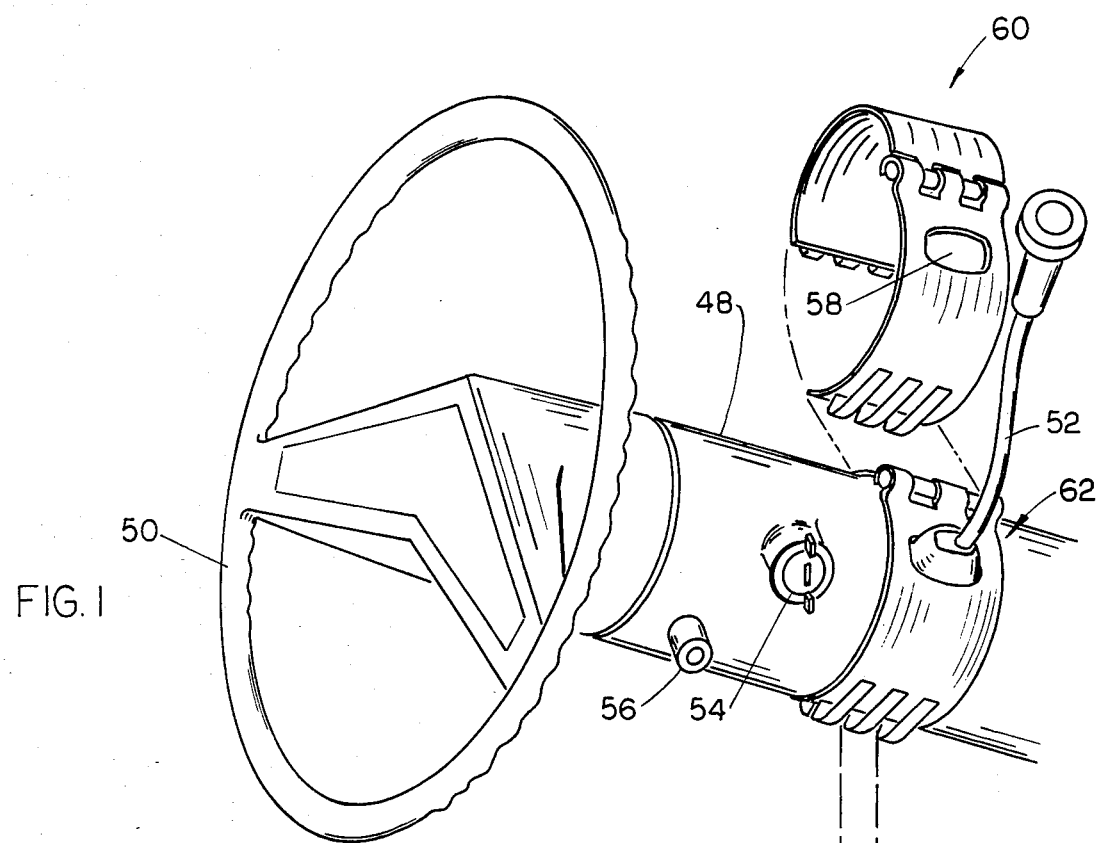
FIG. 1 shows an anti-theft device according to this invention prior to and after installation on a vehicle steering column.

Referring now to FIG. 1, a steering column 48 for a vehicle (not shown) includes a steering wheel 50 and a gear shift lever 52 protruding from the side. Other projections may also be located on the steering column where it is desired to mount the anti-theft device. For instance, ignition switch 54 or emergency light switch 56 are shown in FIG. 1. The ignition switch or emergency light switch may be positioned on steering columns of other vehicles in the area in which the anti-theft device is to be installed. The anti-theft device includes an opening 58 for receiving gear shift lever 52 when the anti-theft device is installed in the steering column. The opening is sized and positioned to allow full operation and movement of the gear shift lever. Other openings in the anti-theft device may be provided to accommodate other projections in the steering column as required. Of course, if no projections are present, no openings need to be provided.

FIG. 1 illustrates the installation of the anti-theft device of the present invention on steering column 48. At 60, the anti-theft device as shown in an open position, with the band portions 12 and 14 rotated apart about hinge 20. The gear shift lever is inserted through opening 58 and the end edges 26 and 28 of the band portions brought together so that the anti-theft device is in close surrounding relation to the steering column in the desired location, as shown at 62 in FIG. 1. It is not necessary to hold two unconnected portions together while affixing them to the steering column, as in previous designs. Screws 36 are then each threaded through one pair of aligned holes 30 and 32. As previously discussed, epoxy may be applied to the heads of the screws to permanently secure the anti-theft device to the steering column.

Figure 5:
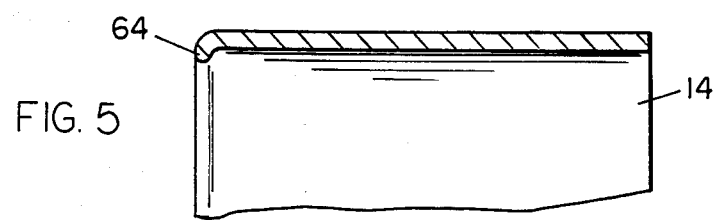
FIG. 5 is a cross-sectional view of this invention along plane 5—5 of FIG. 2.

In the preferred embodiment of the invention, the steering column 48 also includes an annular groove (not shown in FIG. 1). The anti-theft device, as shown in more detail in FIG. 5, also includes a ridge or lip 64 along the circumference of one longitudinal edge thereof. The ridge is constructed and positioned to engage the groove on the steering column when the anti-theft device is installed. The ridge prevents a thief or unauthorized user of the vehicle from forcing the anti-theft device in a longitudinal direction along the steering column. This may be a particular problem if the anti-theft device does not overlay any projections on the steering column. Of course, ridge 64 may be positioned along the opposite longitudinal edge of the band portions, or at any intermediate position on an inside surface of the band portions as required, to be aligned with the groove. Alternatively, more than one groove may be incorporated into the steering column, in which case a like number of concentric ridges may be added to the interior surfaces of the band portions.

Thus, the present invention is an anti-theft device which is effective in preventing damage by a thief to a steering column, yet by being formed of two hingedly connected rigid band portions with aligned openings for projections on the steering column and a ridge for engagement with a groove on the steering column, is easily installed and permanently affixed thereto.

While several embodiments of the invention have been generally described, it will be understood that the invention is not limited thereto. Many modifications may be made and will become apparent to those skilled in the art.

What is claimed is:

1. An anti-theft device for use on an automobile steering column comprising:
    a pair of rigid, semi-circular band portions hingedly connected along their respective first end edges and adpated for encircling the steering column in close surrounding relationship when their respective second end edges are brought together;
    a pair of opposed flanges, each of said flanges being mounted on one of said band portions adjacent its first end edge, said flanges having a pair of aligned openings;
    a screw for insertion through one of said aligned openings and threaded engagement of the other of said aligned openings to secure said band portions when their respective second end edges are brought together; and
    a pair of laterally spaced reinforcing bands mounted on one of said band portions to prevent lateral access to the head of said screw with a pair of pliers or the like.

2. An anti-theft device as recited in claim 1, wherein said reinforcing bands extend from the exterior surface of the one of said band portions upon which they are mounted to the top of the one of said flanges which is mounted on the one of said band portions upon which they are mounted.

3. An anti-theft device as recited in claim 1, further comprising a tip along the circumference of one side edge of each of said band portions to engage a groove in the steering column.

4. An anti-theft device for use on an automobile steering column, comprising:
    a pair of rigid, semi-circular band portions hingedly connected along their respective first end edges and adapted for encircling the steering column in close surrounding relationship when their respective second end edges are brought together;
    a pair of opposed flanges, each of said flanges being mounted on one of said band portions adjacent its first end edge, said flanges having two pairs of aligned openings;
    a pair of screws, each of said screws being for insertion through one of said aligned openings in each pair of said aligned openings and threaded engagement of the other of said aligned openings in the same pair of said aligned openings to secure said band portions when their respective second end edges are brought together; and
    three laterally spaced reinforcing bands mounted on one of said band portions to prevent lateral access to the heads of said screws with a pair of pliers or the like, said reinforcing bands extending from the exterior surface of the one of said band portions upon which they are mounted to the top of the one of said flanges which is mounted on the one of said band portions upon which they are mounted.

5. An anti-theft device as recited in claim 4, further comprising a lip along the circumference of one side edge of each of said band portions to engage a groove in the steering column.

6. An anti-theft device for use on an automobile steering column, comprising:
    a pair of rigid, semi-circular band portions hingedly connected along their respective first end edges and adapted for encircling the steering column in close surrounding relationship when their respective second end edges are brought together;
    a pair of opposed flanges, each of said flanges being mounted on one of said band portions adjacent its first end edge, said flanges having two pairs of aligned openings;

a pair of screws, each of said screws being for insertion through one of said aligned openings in each pair of said aligned openings and threaded engagement of the other of said aligned openings in the same pair of said aligned openings to secure said band portions when their respective second end edges are brought together;

means for sealing the tool receiving cavities in the heads of said screws after said band Portions are secured to prevent removal of said screws with tools which are intended for engaging said cavities; and three laterally spaced reinforcing bands mounted on one of said band portions to prevent lateral access to the heads of said screws with a pair of pliers or the like, said reinforcing bands extending from the exterior surface of the one of said band portions upon which they are mounted to the top of the one of said flanges which is mounted on the one of said band portions upon which they are mounted.

7. An anti-theft device as recited in claim 6, further comprising a lip along the circumference of one side edge of each of said band portions to engage a groove in the steering column..

* * * * *